United States Patent
Lu et al.

(10) Patent No.: US 12,058,770 B2
(45) Date of Patent: Aug. 6, 2024

(54) CONNECTION RELEASING METHOD, DATA PROCESSING METHOD, DEVICE, AND STORAGE MEDIUM

(71) Applicant: GUANGDONG OPPO MOBILE TELECOMMUNICATIONS CORP., LTD., Guangdong (CN)

(72) Inventors: Qianxi Lu, Guangdong (CN); Xin You, Guangdong (CN); Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 553 days.

(21) Appl. No.: 17/191,096

(22) Filed: Mar. 3, 2021

(65) Prior Publication Data

US 2021/0195682 A1    Jun. 24, 2021

Related U.S. Application Data

(63) Continuation of application No. PCT/CN2019/074515, filed on Feb. 1, 2019.

(30) Foreign Application Priority Data

| Sep. 17, 2018 | (WO) | PCT/CN2018/106054 |
| Oct. 26, 2018 | (WO) | PCT/CN2018/112227 |
| Nov. 5, 2018 | (WO) | PCT/CN2018/114022 |

(51) Int. Cl.
*H04W 76/38* (2018.01)
*H04W 36/08* (2009.01)

(52) U.S. Cl.
CPC ........... *H04W 76/38* (2018.02); *H04W 36/08* (2013.01)

(58) Field of Classification Search
CPC .................................................... H04W 36/08
See application file for complete search history.

(56) References Cited

U.S. PATENT DOCUMENTS

| 8,804,742 B2 | 8/2014 | Kim et al. | |
| 2013/0201823 A1* | 8/2013 | Gupta | H04B 7/024 |
| | | | 370/230 |

(Continued)

FOREIGN PATENT DOCUMENTS

| CN | 103826260 A | 5/2014 |
| CN | 106572544 A | 4/2017 |

(Continued)

OTHER PUBLICATIONS

3GPP TS 38.323, V16.3.0, 3rd Generation Partnership Project; Technical Specification Group Radio Access Network; Packet Data Convergence Protocol (PDCP) specification (Release 16), Mar. 2021. (40 pages).

(Continued)

*Primary Examiner* — Ajay Cattungal
(74) *Attorney, Agent, or Firm* — Young Basile Hanlon & MacFarlane, P.C.

(57) ABSTRACT

Disclosed in the present disclosure is a connection releasing method, including: after a timer times out, a terminal device releases the connection between the terminal device and a first network device. Also disclosed in the present disclosure are another connection releasing method, a data processing method, a terminal device, a first network device, a second network device, and a storage medium.

15 Claims, 4 Drawing Sheets

(56) References Cited

U.S. PATENT DOCUMENTS

| | | |
|---|---|---|
| 2014/0029551 A1 | 1/2014 | Dinan |
| 2015/0237533 A1 | 8/2015 | Keskitalo et al. |
| 2015/0245266 A1* | 8/2015 | Lee .................. H04W 36/16 455/436 |
| 2015/0365897 A1* | 12/2015 | Hu .................... H04W 76/27 455/574 |
| 2016/0157101 A1 | 6/2016 | Do et al. |
| 2016/0255675 A1 | 9/2016 | Van Lieshout et al. |
| 2017/0188408 A1* | 6/2017 | Jung ................... H04W 76/19 |
| 2017/0295521 A1* | 10/2017 | Duan ............... H04W 36/0022 |
| 2018/0234838 A1* | 8/2018 | Mildh ................ H04W 60/02 |
| 2019/0380081 A1* | 12/2019 | Chang ............. H04W 36/0072 |
| 2020/0137639 A1* | 4/2020 | Yuan ............... H04W 36/0011 |
| 2020/0187069 A1* | 6/2020 | Hong ............ H04W 36/00837 |
| 2020/0275485 A1* | 8/2020 | Babaei ............ H04W 74/0808 |

FOREIGN PATENT DOCUMENTS

| | | |
|---|---|---|
| CN | 107113658 A | 8/2017 |
| CN | 107371208 A | 11/2017 |
| CN | 107371210 A | 11/2017 |
| CN | 107404734 A | 11/2017 |
| CN | 107886961 A | 4/2018 |
| CN | 108377494 A | 8/2018 |
| EP | 2928261 A1 | 10/2015 |
| GB | 2525891 A | 11/2015 |

OTHER PUBLICATIONS

3GPP TS 38.331 V16.4.1, 3rd Generation Partnership Project; Technical Specification Group Radio Access Network; Radio Resource Control (RRC) protocol specification (Release 16), Mar. 2021. (949 pages).

Extended European Search Report for EP Application 22162817.5 mailed Jun. 8, 2022. (12 pages).

Extended European Search Report for EP Application 19861980.1 mailed Aug. 20, 2021. (10 pages).

International Search Report with English Translation for PCT/CN2018/114022 mailed Jun. 19, 2019.

International Search Report with English Translation for PCT/CN2018/106054 mailed Jun. 17, 2019.

International Search Report with English Translation for PCT/CN2019/074515 mailed May 31, 2019.

Chinese First Office Action with English Translation for CN Application 202210437011.0 mailed May 24, 2023. (17 pages).

Chinese Second Office Action with English Translation for CN Application 202210437011.0 mailed Jul. 21, 2023. (13 pages).

* cited by examiner

After a timer times out, a terminal device releases a connection between the terminal device and a first network device —S201

FIG. 3

A first network device sends a timer to a terminal device —S301

The first network device releases a protocol stack corresponding to the terminal device —S300

FIG. 4

A second network device sends a timer to a terminal device —S401

The second network device notifies a first network device to perform data and/or status forwarding —S402

FIG. 5

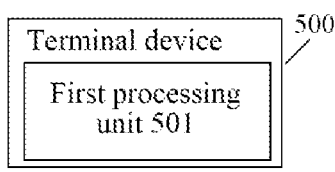

FIG. 6

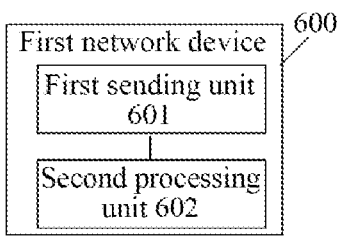

FIG. 7

CONNECTION RELEASING METHOD, DATA PROCESSING METHOD, DEVICE, AND STORAGE MEDIUM

CROSS-REFERENCE TO RELATED APPLICATION(S)

The present application is a continuation application of PCT Patent Application No. PCT/CN2019/074515, filed on Feb. 1, 2019, which claims priorities to PCT Patent Application No. PCT/CN2018/106054, filed on Sep. 17, 2018, PCT Patent Application No. PCT/CN2018/112227, filed on Oct. 26, 2018, and PCT Patent Application No. PCT/CN2018/114022, filed on Nov. 5, 2018. The present application claims priority and the benefit of the above-identified applications, and the above-identified applications are incorporated by reference herein in their entireties.

TECHNICAL FIELD

The present disclosure relates to the field of wireless communication technology, in particular to a connection releasing method, a data processing method, a device and a storage medium.

BACKGROUND

In a cell handover procedure in the related art, as shown in FIG. 1, after a terminal device acquires a Radio Resource Control (RRC) Reconfiguration message, Packet Data Convergence Protocol (PDCP)/Radio Link Control (RLC)/Media Access Control (MAC)/Low Layer, etc. are reconfigured as Stacks of a target base station based on the RRC Reconfiguration message, and at the same time, data sending and receiving of an Up Link (UL)/a Down Link (DL) of between the terminal device and a source base station is stopped. Therefore, in the process of cell handover, the terminal device maintains a connection with only one of the target base station and the source base station.

In order to realize a Oms handover delay in the process of cell handover, two sets of stacks of PDCP/RLC/MAC/Low Layer can be maintained to maintain operations such as data/signaling transmission between the terminal device and the source base station and between the terminal device and the target base station, respectively. In such a case, there is no effective solution about how to release a connection between the terminal device and the source base station.

SUMMARY

In order to solve the above technical problem, implementations of the present disclosure provide a method for connection releasing, a method for data processing, a device and a storage medium, to realize connection release between a terminal device and a source base station.

In a first aspect, an implementation of the present disclosure provides a method for connection releasing, including: releasing, by a terminal device, a connection between the terminal device and a first network device, after a timer times out.

In a second aspect, an implementation of the present disclosure provides a method for data processing, including: sending and/or receiving, by a terminal device, a Protocol Data Unit (PDU) of a Packet Data Convergence Protocol (PDCP) of a corresponding bearer based on a first key and/or a first Robust Header Compression (ROHC) protocol, when a first condition is met.

In a third aspect, an implementation of the present disclosure provides a method for data processing, including: sending and/or receiving, by a terminal device, a PDCP entity status report, when a second condition is met.

In a fourth aspect, an implementation of the present disclosure provides a method for connection releasing, in which a first network device sends a timer to a terminal device, the timer being carried in a cell handover command and used for releasing a connection between the terminal device and the first network device.

In a fifth aspect, an implementation of the present disclosure provides a method for data processing, including: sending and/or receiving, by a first network device, a PDCP PDU of a corresponding bearer based on a first key and/or a first ROHC protocol, when a first condition is met.

In a sixth aspect, an implementation of the present disclosure provides a method for data processing, including: sending and/or receiving, by a first network device, a PDCP entity status report, when a second condition is met.

In a seventh aspect, an implementation of the present disclosure provides a method for connection releasing, including: sending, by a second network device, a timer to a terminal device, the timer being carried in a radio resource control (RRC) signaling and used for releasing a connection between the terminal device and a first network device.

In an eighth aspect, an implementation of the present disclosure provides a method for data processing, including: sending and/or receiving, by a second network device, a PDCP PDU of a corresponding bearer based on a first key and/or a first ROHC protocol, when a first condition is met.

In a ninth aspect, an implementation of the present disclosure provides a method for data processing, including: sending and/or receiving, by a second network device, a PDCP entity status report, when a second condition is met.

In a tenth aspect, an implementation of the present disclosure provides a method for connection releasing, including predefining a timer, the timer being used for releasing a connection between a terminal device and a first network device.

In an eleventh aspect, an implementation of the present disclosure provides a terminal device, including: a first processing unit configured to release a connection between the terminal device and a first network device, after a timer times out.

In a twelfth aspect, an implementation of the present disclosure provides a first network device, including: a first sending unit configured to send a timer to a terminal device, the timer being carried in a cell handover command and used for releasing a connection between the terminal device and the first network device.

In a thirteenth aspect, an implementation of the present disclosure provides a second network device, including: a second sending unit configured to send a timer to a terminal device, the timer being carried in an RRC signaling and used for releasing a connection between the terminal device and a first network device.

In a fourteenth aspect, an implementation of the present disclosure provides a terminal device, including a first transceiving unit. The first transceiving unit is configured to send and/or receive a PDCP PDU of a corresponding bearer based on a first key and/or a first ROHC protocol, when a first condition is met.

In a fifteenth aspect, an implementation of the present disclosure provides a terminal device, including a second transceiving unit. The second transceiving unit is configured to send and/or receive a PDCP entity status report, when a second condition is met.

In a sixteenth aspect, an implementation of the present disclosure provides a first network device, including a third transceiving unit. The third transceiving unit is configured to send and/or receive a PDCP PDU of a corresponding bearer based on a first key and/or a first ROHC protocol.

In a seventeenth aspect, an implementation of the present disclosure provides a first network device, including a fourth transceiving unit. The fourth transceiving unit is configured to send and/or receive a PDCP entity status report, when a second condition is met.

In an eighteenth aspect, an implementation of the present disclosure provides a second network device, including a fifth transceiving unit. The fifth transceiving unit is configured to send and/or receive a PDCP PDU of a corresponding bearer based on a first key and/or a first ROHC protocol, when a first condition is met.

In a nineteenth aspect, an implementation of the present disclosure provides a second network device, including a sixth transceiving unit. The sixth transceiving unit is configured to send and/or receive a PDCP entity status report, when a second condition is met.

In a twentieth aspect, an implementation of the present disclosure provides a terminal device, including: a processor and a memory for storing a computer program capable of being run on the processor, wherein the processor is used for implementing acts of the method for connection releasing performed by a terminal device, when the computer program is run.

In a twenty-first aspect, an implementation of the present disclosure provides a terminal device, including: a processor and a memory for storing a computer program capable of being run on the processor, wherein the processor is used for implementing acts of the method for data processing performed by a terminal device, when the computer program is run.

In a twenty-second aspect, an implementation of the present disclosure provides a network device, including: a processor and a memory for storing a computer program capable of being run on the processor, wherein the processor is used for implementing acts of the method for connection releasing performed by a first network device, when the computer program is run.

In a twenty-third aspect, an implementation of the present disclosure provides a network device, including: a processor and a memory for storing a computer program capable of being run on the processor, wherein the processor is used for implementing acts of the method for data processing performed by a first network device, when the computer program is run.

In a twenty-fourth aspect, an implementation of the present disclosure provides a network device, including: a processor and a memory for storing a computer program capable of being run on the processor, wherein the processor is used for implementing acts of the method for connection releasing performed by a second network device, when the computer program is run.

In a twenty-fifth aspect, an implementation of the present disclosure provides a network device, including: a processor and a memory for storing a computer program capable of being run on the processor, wherein the processor is used for implementing acts of the method for data processing performed by a second network device, when the computer program is run.

In a twenty-sixth aspect, an implementation of the present disclosure provides a storage medium storing an executable program which, when executed by a processor, implements the method for connection releasing performed by a terminal device.

In a twenty-seventh aspect, an implementation of the present disclosure provides a storage medium storing an executable program which, when executed by a processor, implements the method for data processing performed by a terminal device.

In a twenty-eighth aspect, an implementation of the present disclosure provides a storage medium storing an executable program which, when executed by a processor, implements the method for connection releasing performed by a first network device.

In a twenty-ninth aspect, an implementation of the present disclosure provides a storage medium storing an executable program which, when executed by a processor, implements the method for data processing performed by a first network device.

In a thirtieth aspect, an implementation of the present disclosure provides a storage medium storing an executable program which, when executed by a processor, implements the method for connection releasing performed by a second network device.

In a thirty-first aspect, an implementation of the present disclosure provides a storage medium storing an executable program which, when executed by a processor, implements the method for data processing performed by a second network device.

With the method for connection releasing according to an implementation of the present disclosure, when a terminal device maintains connections with a first network device (a source base station) and a second network device (a target base station) simultaneously, a connection between the terminal device and the first network device can be released after a timer times out. Therefore, an implementation of the present disclosure provides a solution about when and how to release a connection between a terminal device and a first network device when the terminal device maintains connections with the first network device (a source base station) and a second network device (a target base station) simultaneously.

BRIEF DESCRIPTION OF DRAWINGS

FIG. 3 is a schematic diagram of an optional processing flow of a method for connection releasing applied to a terminal device according to an implementation of the present disclosure.

FIG. 4 is a schematic diagram of an optional processing flow of a method for connection releasing applied to a first network device according to an implementation of the present disclosure.

FIG. 5 is a schematic diagram of an optional processing flow of a method for connection releasing applied to a second network device according to an implementation of the present disclosure.

FIG. 6 is a schematic diagram of an optional composition structure of a terminal device according to an implementation of the present disclosure.

FIG. 7 is a schematic diagram of an optional composition structure of a first network device according to an implementation of the present disclosure.

DETAILED DESCRIPTION

To understand features and technical contents of implementations of the present disclosure in more detail, implementation modes of the implementations of the present disclosure will be described in detail below with reference to accompanying drawings, and the accompanying drawings are used for reference only, but are not intended to limit the implementations of the present disclosure.

In order to solve the problem that uplink transmission cannot be stopped timely in the related art, in an implementation of the present disclosure, a terminal device frequently detects for a transmission stop signal so as to stop data transmission timely. However, frequent detection for a transmission stop signal will inevitably increase power consumption and detection complexity. Especially when a transmission stop signal is carried in a downlink control signaling, a busyness detection is required, which further increases the complexity of detection and increases signaling overhead.

Therefore, the present disclosure provides a method for connection releasing. The method for connection releasing n according to an implementation of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, or a 5G system.

Figure 1:
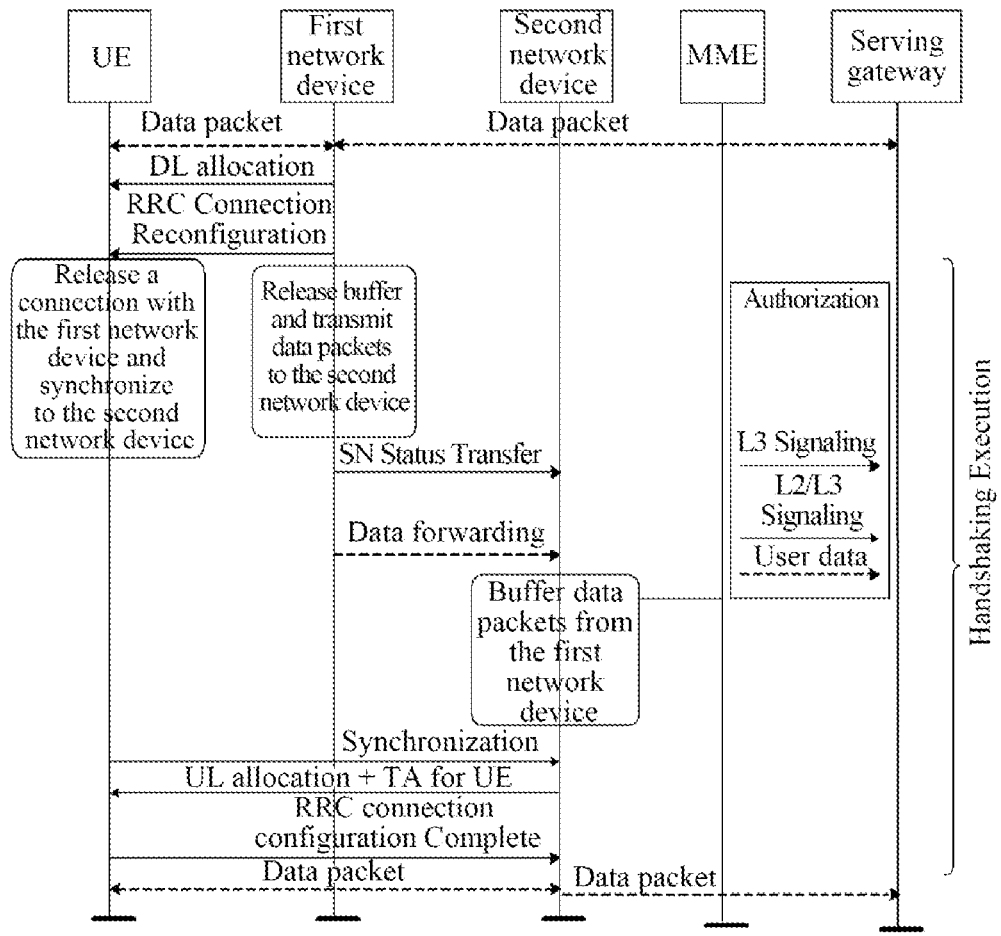
FIG. 1 is a schematic diagram of a processing flow of cell handover in the related art.
Figure 2:
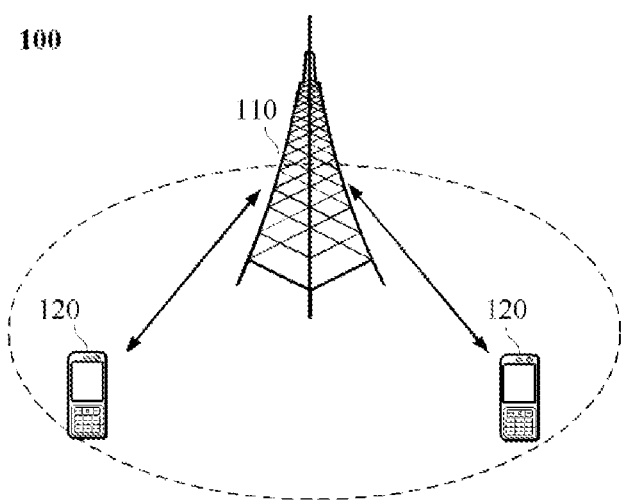
FIG. 2 is a schematic diagram of a composition structure of a communication system according to an implementation of the present disclosure.

Illustratively, a communication system 100 applied in an implementation of the present disclosure is as shown in FIG. 2. The communication system 100 may include a network device 110, and the network device 110 may be a device that communicates with a terminal device 120 (or referred to as a communication terminal, or a terminal). The network device 110 may provide a communication coverage for a specific geographical area, and may communicate with terminal devices located within the coverage area. Optionally, the network device 110 may be a Base Transceiver Station (BTS) in a GSM system or CDMA system, a NodeB (NB) in a WCDMA system, an Evolutional Node B (eNB or eNodeB) in an LTE system, or a radio controller in a Cloud Radio Access Network (CRAN), or the network device may be a network side device in a mobile switch center, a relay station, an access point, a vehicle-mounted device, a wearable device, a hub, a switch, a bridge, a router, or a 5G network, or a network device in a future evolved Public Land Mobile Network (PLMN), etc.

The communication system 100 also includes at least one terminal device 120 located within the coverage area of the network device 110. As used herein, the term "terminal device" includes, but is not limited to, a device configured to connect via a wired line, for example, via a Public Switched Telephone Network (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a DVB-H network, a satellite network, and an AM-FM broadcast transmitter; and/or an apparatus, of another terminal device, configured to receive/send a communication signal; and/or an Internet of Things (IoT) device. A terminal device configured to communicate via a wireless interface may be referred to as a "wireless communication terminal", a "wireless terminal" or a "mobile terminal". Examples of the mobile terminal include, but not limited to, a satellite or cellular telephone, a Personal Communications System (PCS) terminal capable of combining a cellular wireless telephone and data processing, faxing, and data communication abilities, a PDA that may include a radio telephone, a pager, an internet/intranet access, a Web browser, a memo pad, a calendar, and/or a Global Positioning System (GPS) receiver, and a conventional laptop and/or palmtop receiver or another electronic apparatus including a radio telephone transceiver. The terminal device may be referred to as an access terminal, User Equipment (UE), a subscriber unit, a subscriber station, a mobile station, a rover station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved PLMN, or the like.

Optionally, Device to Device (D2D) communication may be performed between the terminal devices 120.

Optionally, the 5G system or 5G network may also be referred to as a New Radio (NR) system or an NR network.

FIG. 2 shows one network device and two terminal devices as an example. Optionally, the communication system 100 may include multiple network devices, and other quantities of terminal devices may be included within the coverage area of each network device, and this is not limited in the implementations of the present disclosure.

Optionally, the communication system 100 may further include other network entities such as a network controller and a mobile management entity, which is not limited in the implementations of the present disclosure.

It should be understood that devices with communication functions in a network/system may be referred to as communication devices in the implementations of the present disclosure. Taking the communication system 100 shown in FIG. 2 as an example, communication devices may include a network device 110 and a terminal device 120 which have communication functions, and the network device 110 and the terminal device 120 may be the specific devices described above, which will not be described here again. The communication devices may also include other devices in the communication system 100, e.g., other network entities such as a network controller and a mobile management entity, which is not limited in the implementations of the present disclosure.

As shown in FIG. 3, an optional processing flow of a method for connection releasing applied to a terminal device according to an implementation of the present disclosure includes act S201.

In act S201, a terminal device releases a connection between the terminal device and a first network device, after a timer times out.

In an implementation of the present disclosure, the terminal device first acquires the timer, and starts the timer after acquiring the timer.

In some implementations, the implementation process of the terminal device acquiring the timer and starting the timer is as follows.

A first network device sends a cell handover command to the terminal device to trigger the terminal device to execute cell handover; and upon receiving the cell handover command, the terminal device sets up a stack of PDCP/RLC/MAC/low layer between the terminal device and a second network device. At this time, the terminal device maintains two stacks of PDCP/RLC/MAC/low layer respectively, i.e. the stack between the terminal device and the first network device and the stack between the terminal device and the second network device, so as to realize the communication between the terminal device and the first network device and the communication between the terminal device and the second network device. In this process, the cell handover command carries the timer.

The timer carried in the cell handover command may be configured and sent to the terminal device by the first network device; or configured by the second network device and sent to the first network device, and then sent to the terminal device via the first network device; or configured by the first network device through negotiation with the second network device, and then sent to the terminal device by the first network device.

After receiving the timer carried in the cell handover command, the terminal device may start the timer upon receiving the handover command; or start the timer when the terminal device initiates a random access procedure; or start the timer when the terminal device reports a cell handover completion message; or start the timer after the terminal device establishes a first Data Resource Bearer (DRB) connection with the second network device; or start the timer after the terminal device receives a timer starting instruction which is sent by the second network device after the second network device receives a path switch request ack message, and at the same time, the second network device notifies the first network device to start a corresponding timer.

In some other implementations, the implementation process of the terminal device acquiring the timer and starting the timer is as follows.

Upon receiving the path switch request ack message, the second network device sends a Radio Resource Control (RRC) signaling to the terminal device, the RRC signaling carries the timer and instructs the terminal device to start the timer after receiving the timer. At the same time, the second network device notifies the first network device to start a corresponding timer.

In some further implementations, the implementation process of the terminal device acquiring the timer is as follows.

The terminal device acquires information of the timer according to preconfigured information.

Optionally, the mode for preconfiguring is a mode of protocol agreement; that is, timer information is stipulated in the protocol, and the terminal device acquires the timer information according to protocol agreement. Optionally, the timer information is configuration information of the timer, such as a preset duration of the timer.

In an implementation of the present disclosure, a duration is preset for the timer, starting the timer indicates that the timer starts timing, and when the preset duration of the timer is reached, it indicates that the timer times out. After the timer times out, the terminal device releases a connection between the terminal device and the first network device, thereby stopping data sending and receiving between the terminal device and the first network device. After the timer times out, the terminal device releases a protocol stack between the terminal device and the first network device. After the timer times out, the first network device releases a protocol stack corresponding to the terminal device, and notifies the second network device of information such as data, configuration variables, status report of the first network device side at a specific time according to an actual scenario.

Optionally, after the timer times out, the second network device notifies the first network device to perform data and/or status forwarding.

In an implementation of the present disclosure, the preset duration of the timer is such that the timer times out after the terminal device reports a cell handover completion message. That is, the terminal device reports the cell handover completion message before the timer times out.

Alternatively, the preset duration of the timer is such that the timer times out after the terminal device establishes a first DRB connection with the second network device. That is, the terminal device establishes the first DRB connection with the second network device before the timer times out.

Alternatively, the preset duration of the timer is such that the timer times out after an X duration lapses after the terminal device completes cell handover or the terminal device reports a cell handover completion message. Here, the X duration may be X symbols, X sub-frames, X frames, X slots, or X sub-slots.

Alternatively, the preset duration of the timer is such that the timer times out before the terminal device initiates a random access procedure. That is, within the preset duration of the timer, the terminal device can initiate a random access procedure.

It should be noted that the first network device is a source network device in the cell handover process, and the second network device is a target network device in the cell handover process.

As shown in FIG. 4, an optional processing flow of a method for connection releasing applied to a first network device according to an implementation of the present disclosure includes act S301.

In act S301, a first network device sends a timer to a terminal device.

In an implementation of the present disclosure, the timer is carried in a cell handover command and used for releasing a connection between the terminal device and the first network device.

Optionally, the cell handover command is also used for instructing the terminal device to start the timer.

It should be noted that the description related to the timer in an implementation of the present disclosure is the same as that in the above act S201, which will not be repeated here.

In some implementations, after the first network device determines that the timer exceeds the preset duration, the method further includes act S300.

In act S300, the first network device releases a protocol stack corresponding to the terminal device.

Optionally, the first network device notifies the second network device of data, configuration variables, status reports and other information of the first network device side at a specific time according to an actual scenario.

It should be noted that the first network device is a source network device in the cell handover process, and the second network device is a target network device in the cell handover process.

As shown in FIG. 5, an optional processing flow of a method for connection releasing applied to a second network device according to an implementation of the present disclosure includes act S401.

In act S401, a second network device sends a timer to a terminal device.

In an implementation of the present disclosure, the timer is carried in an RRC signaling, and the timer is used for releasing a connection between the terminal device and a first network device, thereby interrupting data sending and receiving between the first network device and the terminal device.

In some implementations, the RRC signaling is further used for instructing the terminal device to start the timer.

Here, the timer may be configured by the second network device through negotiation with the first network device; or the timer is configured by the second network device, sent to the first network device and then sent to the terminal device via the first network device.

It should be noted that the description related to the timer in an implementation of the present disclosure is the same as that in the above act S201, which will not be repeated here.

In an implementation of the present disclosure, after the timer exceeds the preset duration, the method further includes act S402.

In act S402, the second network device notifies the first network device to perform data and/or status forwarding.

It should be noted that the first network device is a source network device in the cell handover process, and the second network device is a target network device in the cell handover process.

An optional processing flow of a method for connection releasing applied to a communication system including a first network device, a second network device and a terminal device according to an implementation of the present disclosure includes acts a-e.

In act a, the second network device sends a timer to the terminal device.

In a specific implementation, the second network device sends a timer to the terminal device after receiving a path switch request ack message.

In act b, the second network device notifies the first network device to start the timer.

In act c, the terminal device releases a connection with the first network device after the timer times out.

In act d, the first network device releases a protocol stack of the terminal device after the timer times out.

In act e, the first network device sends its own data, configuration variables, status reports and other information to the second network device.

An implementation of the present disclosure further provides a method for data processing applied to a terminal device, including:

sending and/or receiving, by the terminal device, a PDCP PDU of a corresponding bearer based on a first key and/or a first ROHC protocol when a first condition is met.

In a specific implementation, when the first condition is met, the terminal device sends the PDCP PDU of a corresponding bearer to the first network device; and/or receives the PDCP PDU of a corresponding bearer sent by the first network device; and/or receives the PDCP PDU of a corresponding bearer sent by the second network device, based on the first key and/or the first ROHC protocol.

The first condition includes at least one of the following: when the terminal device receives a handover command; when the terminal device receives a PDU with a first Serial Number (SN); when the terminal device receives a PDU carrying an End-marker indication; when the terminal device receives first indication information in a PDCP PDU header; when the terminal device receives path switch completion indication information; when the terminal device releases a protocol stack corresponding to the first network device; when there is no longer data transmission between the terminal device and the first network device; when the terminal device sends a handover completion message; after the terminal device sends a handover completion message; when the terminal device sends a PDU with the first SN; when the terminal device sends a next PDU of the PDU with the End-marker indication; when the PDCP PDU header sent by the terminal device contains first indication information; when all PDCP PDUs transmitted by the terminal device using a second key and/or a second ROHC are successfully acknowledged; when the terminal device sends a success acknowledgement that the PDCP PDU with the End-marker indication has been received; after the terminal device receives a key change trigger, the key changing from the second key to the first key; after the terminal device receives a ROHC change trigger, the ROHC changing from the second ROHC to the first ROHC; when a preset timer times out; when the terminal device releases the connection with the first network device; when the terminal device receives an instruction of releasing a resource connection stack connected with the first network device; when the terminal device receives a target stack setup request; when the terminal device sets up a target stack; and when/after the target stack of the terminal device is set up. Here, the terminal device receives an instruction of releasing the resource connection stack connected with the first network device that is sent by the first network device or the second network device.

In an implementation of the present disclosure, a scenario in which the terminal device sends and/or receives a PDCP PDU of a corresponding bearer to/from the first network device or the second network device based on the first key and/or the first ROHC protocol is: when the terminal device releases a connection with the first network device, or when the terminal device is going to release a connection with the first network device. The first network device is a source network device in cell handover, and the second network device is a target network device in cell handover.

In some implementations, the method for data processing applied to the terminal device further includes: retransmitting, by the terminal device, a PDCP PDU of a first type.

The PDCP PDU of the first type includes at least one of the following: a data packet which has been sent and for which no successful transmission acknowledgement is received, when the first condition is met; a data packet which has been sent but is not successfully transmitted, when the first condition is met; and a PDCP PDU which has been sent and for which no automatic repeat request (ARQ) acknowledgement (ACK) message is received, when the first condition is met. A data packet for which no successful transmission acknowledgement is received, or a data packet which is not successfully transmitted may include at least one of the following: a data packet which is determined, according to an Automatic Repeat request (ARQ), as not successfully transmitted; a data packet for which no ARQ Acknowledgement (ACK) is received; a PDCP PDU for which no ARQ ACK is received; a data packet for which no HARQ ACK is received; a data packet which is determined as lost; a data packet which is determined as transmitted incorrectly; and a data packet whose transmission status is uncertain or unknown. The data packet may be at least one of the following: a PDCP PDU, a PDCP PDU segment, a data packet containing the PDCP PDU, and a data packet corresponding to the PDCP PDU information; a data packet containing the PDCP PDU part, and a data packet corresponding to the PDCP PDU part information; and a data packet containing the PDCP PDU segment, and a data packet corresponding to the PDCP PDU segment information.

In a specific implementation, the terminal device sends and/or receives a PDCP PDU of a corresponding bearer according to the second key and/or the second ROHC protocol; or the terminal device sends and/or receives a PDCP PDU of a corresponding bearer according to the first key and/or the first ROHC protocol.

Here, retransmitting, by the terminal device, the PDCP PDU of the first type includes:

encrypting and compressing, by the terminal device, the PDCP PDU of the corresponding bearer based on the first key and/or the first ROHC protocol; or decrypting and decompressing, by the terminal device, the PDCP PDU of the corresponding bearer based on the first key and/or the first ROHC protocol.

Alternatively, retransmitting, by the terminal device, the PDCP PDU of the first type includes: encrypting and compressing, by the terminal device, the PDCP PDU of the corresponding bearer based on the second key and/or the second ROHC protocol; or decrypting and decompressing, by the terminal device, the PDCP PDU of the corresponding bearer based on the second key and/or the second ROHC protocol.

In an implementation of the present disclosure, the PDCP PDU of the first type is discarded. Optionally, for an uplink PDCP PDU, the first type of PDCP PDU is discarded by the terminal device. For a downlink PDCP PDU, the PDCP PDU is discarded by the network device.

An implementation of the present disclosure further provides another method for data processing applied to a terminal device, including:

sending and/or receiving, by a terminal device, a PDCP entity status report when a second condition is met. The second condition includes at least one of the following: when the terminal device receives a handover command; when the terminal device receives a PDU with a first SN; when the terminal device receives a PDU carrying an End-marker indication; when the terminal device receives first indication information in a PDCP PDU header; when the terminal device receives path switch completion indication information; when the terminal device releases a protocol stack corresponding to the first network device; when there is no longer data transmission between the terminal device and the first network device; when the terminal device sends a handover completion message; after the terminal device sends a handover completion message; when the terminal device sends a PDU with the first SN; when the terminal device sends a next PDU of the PDU with the End-marker indication; when the PDCP PDU header sent by the terminal device contains first indication information; when all PDCP PDUs transmitted by the terminal device using a second key and/or a second ROHC are successfully acknowledged; when the terminal device sends a success acknowledgement that the PDCP PDU with the End-marker indication has been received; after the terminal device receives a key change trigger, the key changing from the second key to the first key; after the terminal device receives a ROHC change trigger, the ROHC changing from the second ROHC to the first ROHC; when a preset timer times out; when the terminal device releases the connection with the first network device; when the terminal device receives an instruction of releasing a resource connection stack connected with the first network device; when the terminal device receives a target stack setup request; when the terminal device sets up a target stack; and when/after the target stack of the terminal device is set up. Here, the terminal device receives an instruction of releasing the resource connection stack connected with the first network device that is sent by the first network device or the second network device.

In an implementation of the present disclosure, the terminal device sends an uplink PDCP status report for downlink data to the first network device or the second network device, and the terminal device receives a downlink PDCP status report for uplink data sent by the first network device or the second network device.

In an implementation of the present disclosure, a scenario in which the terminal device sends and/or receives a PDCP entity status report is: when the terminal device releases a connection with the first network device, or when the terminal device is going to release a connection with the first network device. The first network device is a source network device in cell handover, and the second network device is a target network device in cell handover.

An implementation of the present disclosure further provides a method for data processing applied to a first network device, including:

sending and/or receiving, by the first network device, a PDCP PDU of a corresponding bearer based on the first key and/or the first ROHC protocol, when the first condition is met.

In a specific implementation, when the first condition is met, the first network device sends the PDCP PDU of the corresponding bearer to the terminal device and/or receives the PDCP PDU of the corresponding bearer sent by the terminal device, based on the first key and/or the first ROHC protocol.

The first condition involved in the implementation of the present disclosure is the same as the first condition involved in the above implementation, which will not be repeated here.

In some implementations, the method for data processing applied to the first network device further includes:

receiving, by the first network device, a PDCP PDU of a first type retransmitted by the terminal device.

In an implementation of the present disclosure, the PDCP PDU of the first type includes at least one of the following: a data packet which has been sent and for which no successful transmission acknowledgement is received, when the first condition is met; a data packet which has been sent but is not successfully transmitted, when the first condition is met; and a PDCP PDU which has been sent and for which no ARQ ACK message is received, when the first condition is met.

The PDCP PDU of the first type is a PDCP PDU of a corresponding bearer sent by the terminal device according to the second key and/or the second ROHC protocol, or the PDCP PDU of the first type is a PDCP PDU of a corresponding bearer sent by the terminal device according to the first key and/or the first ROHC protocol.

In an implementation of the present disclosure, the PDCP PDU of the first type is discarded. Optionally, for an uplink PDCP PDU, the first type of PDCP PDU is discarded by the terminal device. For a downlink PDCP PDU, the PDCP PDU is discarded by the network device.

In an implementation of the present disclosure, a scenario in which the first network device sends and/or receives a PDCP PDU of a corresponding bearer based on the first key and/or the first ROHC protocol is: when the terminal device releases a connection with the first network device, or when the terminal device is going to release connection with the first network device. The first network device is a source network device in cell handover, and the second network device is a target network device in cell handover.

An implementation of the present disclosure further provides another method for data processing applied to a first network device, including:

sending and/or receiving, by a first network device, a PDCP entity status report when a second condition is met.

The second condition involved in the implementation of the present disclosure is the same as the second condition involved in the above implementation, which will not be repeated here.

In an implementation of the present disclosure, the first network device receives an uplink PDCP status report for downlink data sent by a terminal device, and the first network device sends a downlink PDCP status report for uplink data to the terminal device.

In an implementation of the present disclosure, a scenario in which the first network device sends and/or receives a PDCP entity status report is: when the terminal device releases a connection with the first network device, or when the terminal device is going to release a connection with the first network device. The first network device is a source network device in cell handover, and the second network device is a target network device in cell handover.

An implementation of the present disclosure further provides a method for data processing applied to a second network device, wherein when a first condition is met, the second network device sends and/or receives a PDCP PDU of a corresponding bearer based on the first key and/or the first ROHC protocol.

In a specific implementation, when the first condition is met, the second network device sends the PDCP PDU of the corresponding bearer to the terminal device and/or receives the PDCP PDU of the corresponding bearer sent by the terminal device, based on the first key and/or the first ROHC protocol.

The first condition involved in the implementation of the present disclosure is the same as the first condition involved in the above implementation, which will not be repeated here.

In some implementations, the method for data processing applied to the second network device further includes:

receiving, by the second network device, the PDCP PDU of the first type retransmitted by the terminal device.

In an implementation of the present disclosure, the PDCP PDU of the first type includes at least one of the following: a data packet which has been sent and for which no successful transmission acknowledgement is received, when the first condition is met; a data packet which has been sent but is not successfully transmitted, when the first condition is met; and a PDCP PDU which has been sent and for which no ARQ ACK message is received, when the first condition is met.

The PDCP PDU of the first type is a PDCP PDU of a corresponding bearer sent by the terminal device according to the second key and/or the second ROHC protocol, or the PDCP PDU of the first type is a PDCP PDU of a corresponding bearer sent by the terminal device according to the first key and/or the first ROHC protocol.

In an implementation of the present disclosure, the PDCP PDU of the first type is discarded. Optionally, for an uplink PDCP PDU, the first type of PDCP PDU is discarded by the terminal device. For a downlink PDCP PDU, the PDCP PDU is discarded by the network device.

In an implementation of the present disclosure, a scenario in which the second network device sends and/or receives a PDCP PDU of a corresponding bearer based on the first key and/or the first ROHC protocol is: when the terminal device releases a connection with the first network device, or when the terminal device is going to release a connection with the first network device. The first network device is a source network device in cell handover, and the second network device is a target network device in cell handover.

An implementation of the present disclosure further provides another method for data processing applied to a second network device, including:

sending and/or receiving, by a second network device, a PDCP entity status report when a second condition is met.

The second condition involved in the implementation of the present disclosure is the same as the second condition involved in the above implementation, which will not be repeated here.

In an implementation of the present disclosure, the second network device receives an uplink PDCP status report for downlink data sent by a terminal device, and the second network device sends a downlink PDCP status report for uplink data to the terminal device.

In an implementation of the present disclosure, a scenario in which the second network device sends and/or receives a PDCP entity status report is: when the terminal device releases a connection with the first network device, or when the terminal device is going to release a connection with the first network device. The first network device is a source network device in cell handover, and the second network device is a target network device in cell handover.

An implementation of the present disclosure further provides a terminal device. A schematic diagram of an optional composition structure of the terminal device 500 is as shown in FIG. 6. The terminal device 500 includes a first processing unit 501.

The first processing unit 501 is configured to release a connection between the terminal device and a first network device after a timer times out.

In some implementations, the first processing unit 501 is further configured to acquire the timer and start the timer.

In some implementations, the first processing unit 501 is configured to receive a cell handover command sent by a first network device, the cell handover command carrying the timer.

In some implementations, the first processing unit 501 is configured to acquire information of the timer according to preconfigured information.

In some implementations, the first processing unit 501 is configured to start the timer after receiving the cell handover command.

In some implementations, the first processing unit 501 is configured to start the timer when initiating a random access procedure.

In some implementations, the first processing unit 501 is configured to start the timer when reporting a cell handover completion message.

In some implementations, the first processing unit 501 is configured to start the timer when establishing a first DRB connection with a second network device.

In some implementations, the first processing unit 501 is configured to start the timer when receiving timer starting instruction information sent by the second network device.

In some implementations, the first processing unit 501 is configured to receive RRC signaling sent by the second network device, the radio resource control signaling carrying the timer.

In some implementations, the first processing unit 501 is configured to start the timer when receiving the timer sent by the second network device.

In some implementations, a preset duration of the timer is such that the timer times out after the terminal device reports a cell handover completion message. That is, the terminal device reports the cell handover completion message before the timer times out.

Alternatively, the preset duration of the timer is such that the timer times out after the terminal device establishes a first DRB connection with the second network device. That is, the terminal device establishes the first DRB connection with the second network device before the timer times out.

Alternatively, the preset duration of the timer is such that the timer times out after an X duration lapses after the terminal device completes cell handover or the terminal device reports a cell handover completion message. Here, the X duration may be X symbols, X sub-frames, X frames, X slots, or X sub-slots.

Alternatively, the preset duration of the timer is such that the timer times out before the terminal device initiates a random access procedure. That is, within the preset duration of the timer, the terminal device can initiate a random access procedure.

It should be noted that the first network device is a source network device in the cell handover process, and the second network device is a target network device in the cell handover process.

An implementation of the present disclosure further provides a first network device. A schematic diagram of an optional composition structure of the first network device 600 is as shown in FIG. 7. The first network device 600 includes a first sending unit 601.

The first sending unit 601 is configured to send a timer to a terminal device. The timer is carried in a cell handover command, and the timer is used for releasing a connection between the terminal device and the first network device.

In some implementations, the cell handover command is further used for instructing the terminal device to start the timer.

In some implementations, the first network device further includes a second processing unit 602 configured to acquire the timer from a second network device.

In some implementations, the first network device further includes a second processing unit 602 configured to configure the timer through negotiation with a second network device.

In some implementations, the preset duration of the timer is such that the timer times out after the terminal device reports a cell handover completion message. That is, the terminal device reports the cell handover completion message before the timer times out.

Alternatively, the preset duration of the timer is such that the timer times out after the terminal device establishes a first DRB connection with the second network device. That is, the terminal device establishes the first DRB connection with the second network device before the timer times out.

Alternatively, the preset duration of the timer is such that the timer times out after an X duration lapses after the terminal device completes cell handover or the terminal device reports a cell handover completion message. Here, the X duration may be X symbols, X sub-frames, X frames, X slots, or X sub-slots.

Alternatively, the preset duration of the timer is such that the timer times out before the terminal device initiates a random access procedure. That is, within the preset duration of the timer, the terminal device can initiate a random access procedure.

It should be noted that the first network device is a source network device in the cell handover process, and the second network device is a target network device in the cell handover process.

Figure 8:
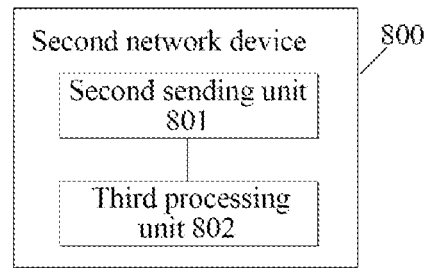
FIG. 8 is a schematic diagram of an optional composition structure of a second network device according to an implementation of the present disclosure.

An implementation of the present disclosure further provides a second network device. A schematic diagram of an optional composition structure of the second network device 800 is as shown in FIG. 8. The second network device 800 includes a second sending unit 801.

The second sending unit 801 is configured to send a timer to a terminal device. The timer is carried in RRC signaling, and the timer is used for releasing a connection between the terminal device and a first network device.

In some implementations, the RRC signaling is further used for instructing the terminal device to start the timer.

In some implementations, the second network device further includes a third processing unit 802 configured to configure the timer through negotiation with the first network device.

In some implementations, the second network device further includes a third processing unit 802 for configuring the timer and sending the timer to the first network device.

In some implementations, the preset duration of the timer is such that the timer times out after the terminal device reports a cell handover completion message. That is, the terminal device reports the cell handover completion message before the timer times out.

Alternatively, the preset duration of the timer is such that the timer times out after the terminal device establishes a first DRB connection with the second network device. That is, the terminal device establishes the first DRB connection with the second network device before the timer times out.

Alternatively, the preset duration of the timer is such that the timer times out after an X duration lapses after the terminal device completes cell handover or the terminal device reports a cell handover completion message. Here, the X duration may be X symbols, X sub-frames, X frames, X slots, or X sub-slots.

Alternatively, the preset duration of the timer is such that the timer times out before the terminal device initiates a random access procedure. That is, within the preset duration of the timer, the terminal device can initiate a random access procedure.

It should be noted that the first network device is a source network device in the cell handover process, and the second network device is a target network device in the cell handover process.

Figure 9:
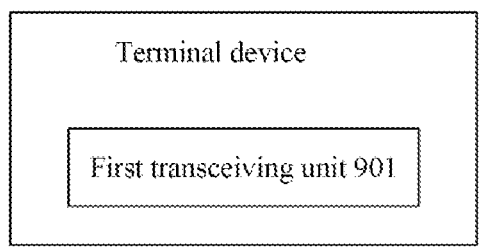
FIG. 9 is a schematic diagram of an optional composition structure of a terminal device according to an implementation of the present disclosure.

An implementation of the present disclosure further provides a terminal device. A schematic diagram of an optional composition structure of the terminal device is as shown in FIG. 9. The terminal device includes: a first transceiving unit 901 configured to send and/or receive a PDCP PDU of a corresponding bearer based on a first key and/or a first ROHC protocol when a first condition is met.

The first condition involved in an implementation of the present disclosure is the same as the first condition involved in the above implementation, which will not be repeated here.

In some implementations, the first transceiving unit 901 is further configured to retransmit a PDCP PDU of a first type.

The PDCP PDU of the first type includes at least one of the following: a data packet which has been sent and for which no successful transmission acknowledgement is received, when the first condition is met; a data packet which has been sent but is not successfully transmitted, when the first condition is met; and a PDCP PDU which has been sent and for which no ARQ ACK message is received, when the first condition is met.

In some implementations, the first transceiving unit 901 is configured to send and/or receive a PDCP PDU of a corresponding bearer based on a second key and/or a second ROHC protocol. Alternatively, the first transceiving unit 901 is configured to send and/or receive a PDCP PDU of a corresponding bearer based on a first key and/or a first ROHC protocol.

In some implementations, the first transceiving unit 901 is configured to encrypt and compress a PDCP PDU of a corresponding bearer based on a first key and/or a first ROHC protocol; or decrypt and decompress a PDCP PDU of a corresponding bearer based on the first key and/or the first ROHC protocol.

In some implementations, the first transceiving unit 901 is configured to encrypt and compress a PDCP PDU of a corresponding bearer based on a second key and/or a second ROHC protocol; or decrypt and decompress a PDCP PDU of a corresponding bearer based on the second key and/or the second ROHC protocol.

Figure 10:
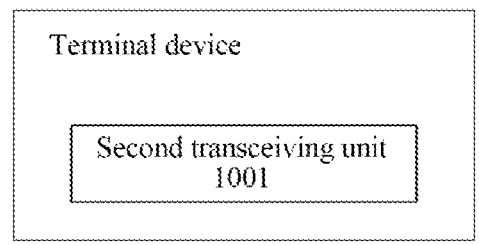
FIG. 10 is a schematic diagram of another optional composition structure of a terminal device according to an implementation of the present disclosure.

An implementation of the present disclosure further provides a terminal device. A schematic diagram of another optional composition structure of the terminal device is as shown in FIG. 10. The terminal device includes a second transceiving unit 1001.

The second transceiving unit 1001 is configured to send and/or receive a PDCP entity status report when a second condition is met.

The second condition involved in an implementation of the present disclosure is the same as the second condition involved in the above implementation, which will not be repeated here.

Figure 11:
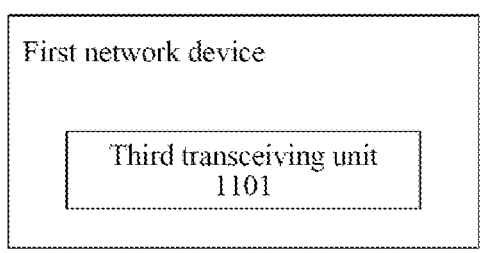
FIG. 11 is a schematic diagram of an optional composition structure of a first network device according to an implementation of the present disclosure.

An implementation of the present disclosure further provides a first network device. A schematic diagram of an optional composition structure of the first network device is as shown in FIG. 11. The first network device includes a third transceiving unit 1101.

The third transceiving unit 1101 is configured to send and/or receive a PDCP PDU of a corresponding bearer based on a first key and/or a first ROHC protocol.

The first condition involved in an implementation of the present disclosure is the same as the first condition involved in the above implementation, which will not be repeated here.

In some implementations, the third transceiving unit 1101 is further configured to receive a PDCP PDU of a first type retransmitted by the terminal device.

The PDCP PDU of the first type includes at least one of the following: a data packet which has been sent and for which no successful transmission acknowledgement is received, when the first condition is met; a data packet which has been sent but is not successfully transmitted, when the first condition is met; and a PDCP PDU which has been sent and for which no ARQ ACK message is received, when the first condition is met.

The PDCP PDU of the first type is a PDCP PDU of a corresponding bearer sent by the terminal device according to the second key and/or the second ROHC protocol, or the PDCP PDU of the first type is a PDCP PDU of a corresponding bearer sent by the terminal device according to the first key and/or the first ROHC protocol.

In an implementation of the present disclosure, the PDCP PDU of the first type is discarded. Optionally, for an uplink PDCP PDU, the first type of PDCP PDU is discarded by the terminal device. For a downlink PDCP PDU, the PDCP PDU is discarded by the network device.

Figure 12:
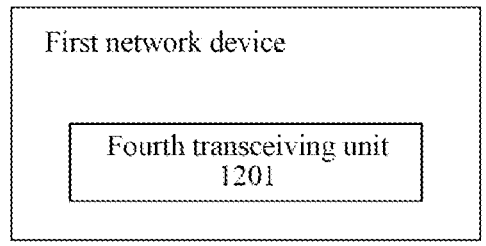
FIG. 12 is a schematic diagram of another optional composition structure of a first network device according to an implementation of the present disclosure.

An implementation of the present disclosure further provides a first network device. A schematic diagram of another optional composition structure of the first network device is as shown in FIG. 12. The first network device includes a fourth transceiving unit 1201.

The fourth transceiving unit 1201 is configured to send and/or receive a PDCP entity status report when a second condition is met.

The second condition involved in an implementation of the present disclosure is the same as the second condition involved in the above implementation, which will not be repeated here.

Figure 13:
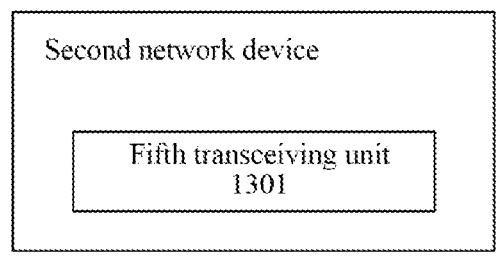
FIG. 13 is a schematic diagram of an optional composition structure of a second network device according to an implementation of the present disclosure.

An implementation of the present disclosure further provides a second network device. A schematic diagram of an optional composition structure of the second network device is as shown in FIG. 13. The second network device includes a fifth transceiving unit 1301.

The fifth transceiving unit 1301 is configured to send and/or receive a PDCP PDU of a corresponding bearer based on a first key and/or a first ROHC protocol when a first condition is met.

The first condition involved in an implementation of the present disclosure is the same as the first condition involved in the above implementation, which will not be repeated here.

In some implementations, the fifth transceiving unit 1301 is further configured to receive a PDCP PDU of a first type retransmitted by the terminal device.

The PDCP PDU of the first type includes at least one of the following: a data packet which has been sent and for which no successful transmission acknowledgement is received, when the first condition is met; a data packet which has been sent but is not successfully transmitted, when the first condition is met; and a PDCP PDU which has been sent and for which no ARQ ACK message is received, when the first condition is met.

The PDCP PDU of the first type is a PDCP PDU of a corresponding bearer sent by the terminal device according to the second key and/or the second ROHC protocol, or the PDCP PDU of the first type is a PDCP PDU of a corresponding bearer sent by the terminal device according to the first key and/or the first ROHC protocol.

In an implementation of the present disclosure, the PDCP PDU of the first type is discarded. Optionally, for an uplink PDCP PDU, the first type of PDCP PDU is discarded by the terminal device. For a downlink PDCP PDU, the PDCP PDU is discarded by the network device.

Figure 14:
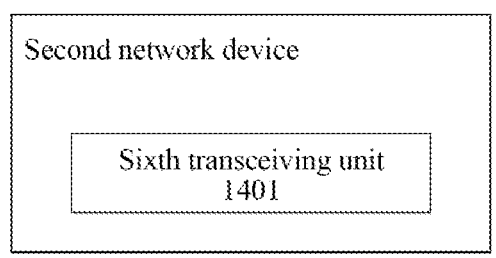
FIG. 14 is a schematic diagram of another optional composition structure of a second network device according to an implementation of the present disclosure.

An implementation of the present disclosure further provides a second network device. A schematic diagram of another optional composition structure of the second network device is as shown in FIG. 14. The second network device includes a sixth transceiving unit 1401.

The sixth transceiving unit 1401 is configured to send and/or receive a PDCP entity status report when a second condition is met.

The second condition involved in an implementation of the present disclosure is the same as the second condition involved in the above implementation, which will not be repeated here.

An implementation of the present disclosure further provides a terminal device, including a processor and a memory for storing a computer program capable of being run on the processor, wherein the processor is used for implementing acts of the method for connection releasing or the method for data processing implemented by the terminal device, when the computer program is run.

An implementation of the present disclosure further provides a network device (a first network device or a second network device), including a processor and a memory for storing a computer program capable of being run on the processor, wherein the processor is used for implementing acts of the method for connection releasing or the method for data processing implemented by the network device, when the computer program is run.

Figure 15:
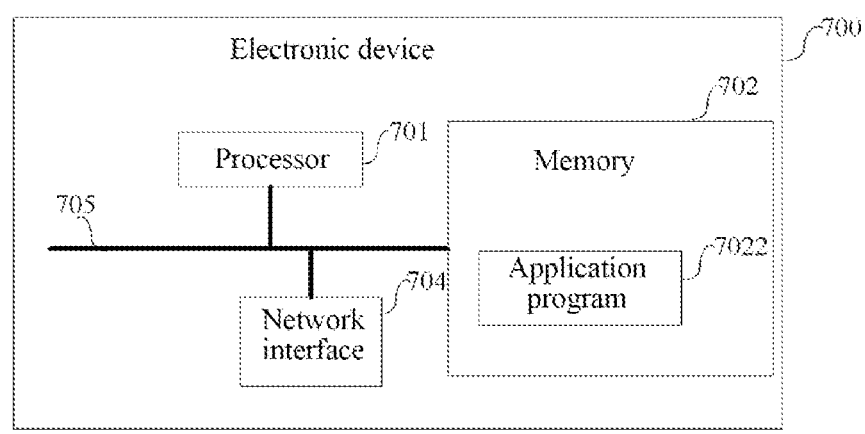
FIG. 15 is a schematic diagram of a composition structure of hardware of an electronic device according to an implementation of the present disclosure.

FIG. 15 is a schematic diagram of a composition structure of hardware of an electronic device (a first network device, a second network device or a terminal device) according to an implementation of the present disclosure. The electronic device 700 includes: at least one processor 701, a memory 702 and at least one network interface 704. Various components in the electronic device 700 are coupled together by a bus system 705. It may be understood that the bus system 705 is used for implementing connection and communication between these components. In addition to a data bus, the bus system 705 includes a power bus, a control bus, and a status signal bus. However, for clarity, all kinds of buses are uniformly referred to as a bus system 705 in FIG. 15.

It can be understood that the memory 702 may be a volatile memory or a non-volatile memory, or may include both a volatile memory and a non-volatile memory. The non-volatile memory may be a ROM, a Programmable Read-Only Memory (PROM), an Erasable Programmable Read-Only Memory (EPROM), an Electrically Erasable Programmable Read-Only Memory (EEPROM), a ferromagnetic random access memory (FRAM), a Flash Memory, a magnetic surface memory, a compact disk, or a Compact Disc Read-Only Memory (CD-ROM). The magnetic surface memory may be a magnetic disk memory or a magnetic tape memory. The volatile memory may be a Random Access Memory (RAM) which serves as an external cache. By way of exemplary but not restrictive illustrations, many forms of RAMs are available, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), and a Direct Rambus Random Access Memory (DRRAM). The memory 702 described in an implementation of the present disclosure is intended to include, but is not limited to, these and any other suitable types of memories.

The memory 702 in an implementation of the present disclosure is used for storing various types of data to support the operation of the electronic device 700. Examples of such data include any computer program for being operated on the electronic device 700, such as an application program 7022. A program for implementing a method according to an implementation of the present disclosure may be included in the application program 7022.

Methods disclosed in the above implementations of the present disclosure may be applied in the processor 701 or implemented by the processor 701. The processor 701 may be an integrated circuit chip with a signal processing capability. In an implementation process, the acts of the methods described above may be accomplished by integrated logic circuits of hardware in the processor 701 or instructions in a form of software. The above-mentioned processor 701 may be a general-purpose processor, a Digital Signal Processor (DSP), or other programmable logic devices, a discrete gate or a transistor logic device, a discrete hardware component, etc. The processor 701 may implement or execute the various methods, acts and logical block diagrams disclosed in the implementations of the present disclosure. The general purpose processor may be a microprocessor or any conventional processor or the like. Acts of the methods disclosed in combination with the implementations of the present disclosure may be directly embodied as being executed and accomplished by a hardware decoding processor or by a combination of hardware and software modules in a decoding processor. The software module may be located in a storage medium, and the storage medium is located in the memory 702. The processor 701 reads information in the memory 702 and accomplishes the acts of the aforementioned methods in combination with hardware thereof.

In an exemplary implementation, the electronic device 700 may be implemented by one or more Application Specific Integrated Circuits (ASICs), DSPs, Programmable Logic Devices (PLDs), Complex Programmable Logic Devices (CPLDs), FPGAs, general-purpose processors, controllers, MCUs, MPUs or other electronic components, for executing the aforementioned methods.

An implementation of the present disclosure further provides a computer readable storage medium configured to store a computer program.

Optionally, the computer readable storage medium may be applied in a network device of an implementation of the present disclosure, and the computer program enables the computer to perform the corresponding processes implemented by the network device in various methods of the implementations of the present disclosure, which will not be repeated here for brevity.

Optionally, the computer readable storage medium may be applied in a terminal device of an implementation of the present disclosure, and the computer program enables the computer to perform the corresponding processes implemented by the terminal device in various methods of the implementations of the present disclosure, which will not be repeated here for brevity.

The present disclosure is described with reference to flowcharts and/or block diagrams of methods, devices (systems), and computer program products according to implementations of the present disclosure. It should be understood that each flow and/or block in the flowchart and/or block diagram, and combinations of flows and/or blocks in the flowchart and/or block diagram may be implemented by computer program instructions. These computer program instructions may be provided to a processor of a general purpose computer, a special purpose computer, an embedded processor or other programmable data processing device to produce a machine, such that the instructions which are executed by the processor of the computer or other programmable data processing device produce a means for implementing the functions specified in one or more processes in a flow chart and/or one or more blocks in a block diagram.

These computer program instructions may also be stored in a computer-readable memory that can direct a computer or other programmable data processing device to operate in a particular manner, such that the instructions stored in the computer-readable memory produce an article of manufacture including an instruction means that implement the functions specified in one or more flows of the flowchart and/or one or more blocks of the block diagram.

These computer program instructions may also be loaded onto a computer or other programmable data processing device to cause a series of operational acts to be performed on the computer or other programmable device to produce computer-implemented processing, such that the instructions which are executed on the computer or other programmable device provide acts for implementing the functions specified in one or more flows in the flowchart and/or one or more blocks in the block diagram.

The above descriptions are only preferred implementations of the present disclosure but are not intended to limit the protection scope of the present disclosure. Any modification, equivalent substitution, improvement, etc. made within the spirit and principles of the present disclosure shall be contained within the protection scope of the present disclosure.

What is claimed is:

1. A method for connection releasing, comprising:
   releasing, by a terminal device, a connection between the terminal device and a first network device, after a timer times out;
   acquiring, by the terminal device, the timer, comprising:
     receiving, by the terminal device, a cell handover command sent by a first network device to trigger the terminal device to execute cell handover, wherein the cell handover command carries the timer; and
     setting up, by the terminal device, a stack of PDCP/RLC/MAC/low layer between the terminal device and a second network device upon receiving the cell handover command; and
   starting, by the terminal device, the timer when establishing a first data resource bearer (DRB) connection with the second network device or when receiving timer starting instruction information sent by the second network device.

2. The method of claim 1, wherein a preset duration of the timer is such that the timer times out after the terminal device reports a cell handover completion message,
   or,
   a preset duration of the timer is such that the timer times out after the terminal device establishes a first DRB connection with a second network device,
   or,
   a preset duration of the timer is such that the timer times out after an X duration lapses after the terminal device completes cell handover or the terminal device reports a cell handover completion message.

3. The method of claim 2, wherein the X duration comprises:
   X symbols, X sub-frames, X frames, X slots, or X sub-slots.

4. The method of claim 1, wherein the first network device is a source network device in cell handover, and the second network device is a target network device in cell handover.

5. A terminal device, comprising a processor and a memory for storing a computer program capable of being run on the processor, wherein
   the processor is used for implementing acts of the method of claim 1 when the computer program is run.

6. A method for connection releasing, comprising:
   sending, by a first network device, a timer to a terminal device, the timer being carried in a cell handover command and used for releasing a connection between the terminal device and the first network device,
   wherein a stack of PDCP/RLC/MAC/low layer between the terminal device and a second network device is set up after sending the cell handover command;
   wherein the cell handover command is further used for instructing the terminal device to start the timer;
   wherein starting the timer comprises:
     when a first data resource bearer (DRB) connection with a second network device is established, the timer is started; or
     when a timer starting instruction information sent by a second network device is received, the timer is started.

7. The method of claim 6, wherein the method further comprises:
   acquiring, by the first network device, the timer from the second network device,
   or,
   configuring, by the first network device, the timer through negotiation with the second network device.

8. The method of claim 6, wherein a preset duration of the timer is such that the timer times out after the terminal device reports a cell handover completion message,
   or,
   a preset duration of the timer is such that the timer times out after the terminal device establishes a first DRB connection with the second network device,
   or,
   a preset duration of the timer is such that the timer times out after an X duration lapses after the terminal device completes cell handover or the terminal device reports a cell handover completion message, wherein the X duration comprises: X symbols, X sub-frames, X frames, X slots, or X sub-slots.

9. The method of claim 6, wherein the first network device is a source network device in cell handover, and the second network device is a target network device in cell handover.

10. A network device, comprising a processor and a memory for storing a computer program capable of being run on the processor, wherein
the processor is used for implementing acts of the method of claim 6 when the computer program is run.

11. A method for connection releasing, comprising:
sending, by a second network device, a timer to a terminal device, the timer being carried in a radio resource control (RRC) signaling and used for releasing a connection between the terminal device and a first network device;
wherein the RRC signaling is further used for instructing the terminal device to start the timer; and
wherein the terminal device starting the timer comprises:
when a first data resource bearer (DRB) connection with the second network device is established, the timer is started; or
when timer starting instruction information sent by the second network device is received, the timer is started.

12. The method of claim 11, wherein the method further comprises:
configuring, by the second network device, the timer through negotiation with the first network device,
or,
configuring, by the second network device, the timer, and sending the timer to the first network device.

13. The method of claim 11, wherein a preset duration of the timer is such that the timer times out after the terminal device reports a cell handover completion message,
or,
a preset duration of the timer is such that the timer times out after the terminal device establishes a first DRB connection with the second network device,
or,
a preset duration of the timer is such that the timer times out after an X duration lapses after the terminal device completes cell handover or the terminal device reports a cell handover completion message, wherein the X duration comprises: X symbols, X sub-frames, X frames, X slots, or X sub-slots.

14. The method of claim 11, wherein the first network device is a source network device in cell handover, and the second network device is a target network device in cell handover.

15. A network device, comprising a processor and a memory for storing a computer program capable of being run on the processor, wherein
the processor is used for implementing acts of the method of claim 11 when the computer program is run.

* * * * *